Sept. 24, 1963 V. DEVÉ ETAL 3,104,431
MOLD AND CORE BLOWER
Filed May 5, 1961 3 Sheets-Sheet 1

INVENTORS
Ronald R. PARKER
Vagn DEVÉ
BY
Pierre l'espérance
PATENT AGENT

Sept. 24, 1963    V. DEVÉ ETAL    3,104,431
MOLD AND CORE BLOWER
Filed May 5, 1961    3 Sheets-Sheet 2

INVENTORS
Ronald R. PARKER
Vagn DEVÉ
BY Pierre Lespérance
PATENT AGENT

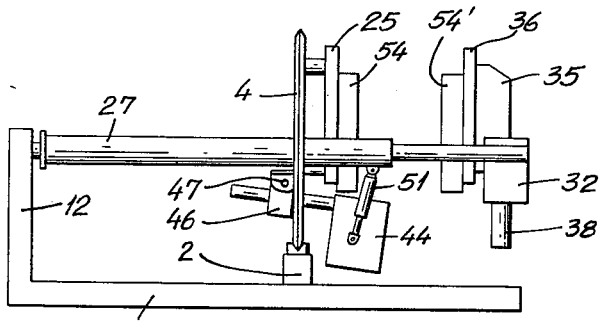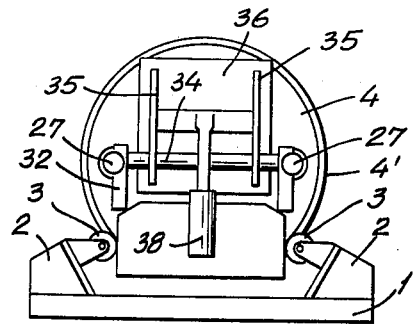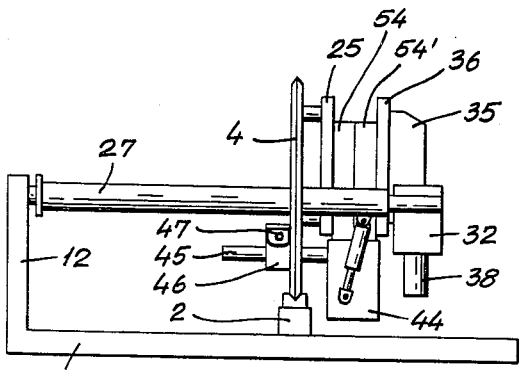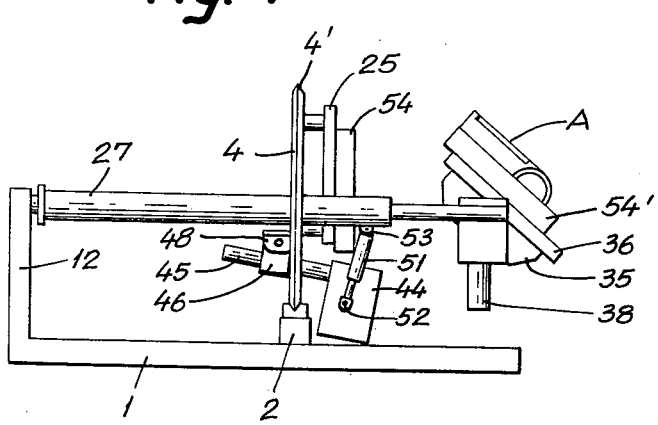

United States Patent Office 3,104,431
Patented Sept. 24, 1963

3,104,431
MOLD AND CORE BLOWER
Vagn Devé, 692 69th Ave., L'Abord-a-Plouffe, Quebec, Canada, and Ronald R. Parker, 1022 Day Road, Schenectady 3, N.Y.
Filed May 5, 1961, Ser. No. 107,995
9 Claims. (Cl. 22—10)

The present invention relates to the art of shell molding and more particularly to a machine for making shell molds and cores from a mixture containing sand and a thermosetting resin and which are subsequently employed in casting.

The machine of the present invention is of the known type in which the heated pattern members or core box halves are mounted for movement towards and away from each other and have an inlet opening whereby, when they are in closed position, molding material may be discharged thereinto from a sand box or hopper adapted to communicate with said inlet opening; the assembly of pattern members and hopper is swingable as a unit in a vertical plane so as to dump into the heated core box the molding material which is allowed to cure for a certain period and then the unit is inverted and the excess uncured molding material is discharged out of the core box back into the hopper and can be used again.

The molding material in the core box is then subjected to a final curing or baking and the pattern members are separated for removing the cured core or mold.

However, in all machines of the prior art, the pattern members in separated position remain parallel to each other and relatively close so that it is rather difficult to remove the cured core or mold. The high temperature of the core box creates a hazard and often results in severe burns to the operator. Moreover in machines of the prior art, access to the pattern members and cores or molds is gained only from one side of the separated pattern members which may result in the breakage of the fragile core or mold as they are not in a readily accessible position for removal.

The general object of the present invention resides in the provision of a mold and core blower of the type above described but which overcomes the above noted disadvantages.

A more specific object of the present invention resides in the provision of a machine of the character described in which one of the plates supporting the pattern members or core box halves is pivotable with respect to the other pattern member supporting plate to take an outwardly inclined position for bringing the cured mold or core into a readily accessible position, whereby the operator cannot burn himself and can grasp and remove the mold or core with both hands and without being hindered by obstructions.

Another important object of the present invention resides in the provision of a machine of the character described in which the pattern member support plates are mounted in a cantilevered manner whereby the pivotable plate when in outwardly pivoted position is entirely free of obstructions at one end of the machine.

Another important object of the present invention resides in a machine of the character described in which the entire cycle of operation is completely automatic, the operator only having to press a button for starting the cycle and to remove the baked or cured mold or core at the end of the cycle.

Another important object of the present invention resides in the provision of a machine of the character described in which the assembly of support plates and sand box are rotated in swinging movement in a vertical plane by a torque tube which is independent of the ram assembly for moving the flip plate towards and away from the other pattern member support plate whereby no stresses are imparted by the torque tube to the cylinders of the ram assembly.

Another object of the present invention resides in the provision of novel means for storing a predetermined quantity of air under pressure in a reservoir and blowing said air into the sand box or hopper to control the rate of blowing of the sand from the hopper into the cavity defined by the contacting core box halves during the investment step.

Another important object of the present invention resides in the provision, in a machine of the character described, of a ram assembly in which the cylinder and piston units have a new construction requiring a minimum amount of hydraulic oil and a hydraulic pump of low capacity to operate said cylinders.

The foregoing and other important objects of the present invention will become more apparent during the following disclosure and by referring to the drawings in which:

FIGURES 6, 7 and 8 are schematic side elevations, in a reduced scale, showing the machine in different stages of its operation; and FIGURE 9 is an end view in the position corresponding to FIGURES 6 or 7.

Figure 3:
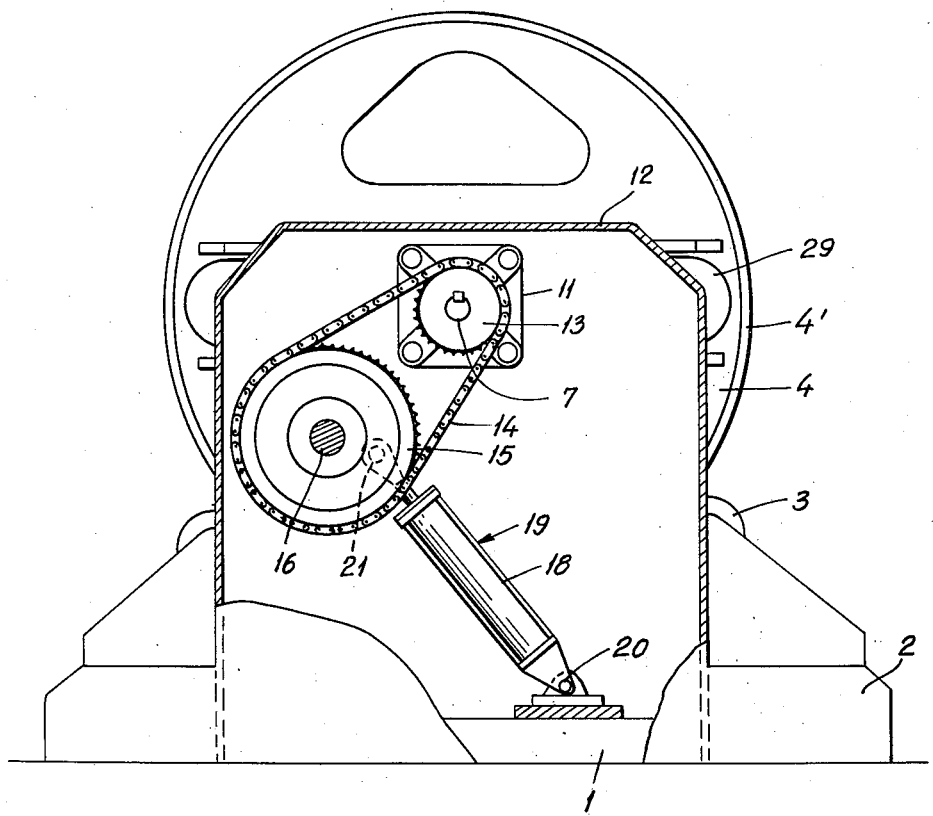
FIGURE 3 is a back end sectional elevation.

Referring now more particularly to the drawings in which like reference characters indicate like elements throughout, the machine comprises a base 1 intermediate the ends of which and on the sides thereof are mounted brackets 2 supporting bearing idle rollers 3. These rollers are grooved and rotatably support a vertically arranged wheel or disc 4 which has bevelled peripheral edges 4' engaging the groove of rollers 3. The center of one side of the disc 4 is rigidly attached to a horizontally disposed centrally located torque tube 5 by means of rivets or bolts 6. The rear end of torque tube 5 is rigidly secured to a stud shaft 7 by means of cap screws 8 passing through annular flange 9 of shaft 7 and threaded within bores of inner flange 10 of the torque tube. The stud shaft 7 is journaled within a bearing block 11 disposed within and secured to the front wall of an upright housing 12 which is mounted at the rear end of the base 1. The rear of the stud shaft 7 supports a sprocket gear 13 keyed thereto and which is driven by sprocket chains 14 (see FIGURE 3) in engagement with a driving sprocket gear 15 secured to a stud shaft 16 journaled in bearings 17 secured to the front and back walls of housing 12 and disposed across the same. The cylinder 18 of a hydraulic cylinder and piston unit 19 is pivotally mounted at its lower end 20 on the base 1 while its piston is pivotally connected at 21 between two flanges 22 secured to stud shaft 16 and serving as crank members. Thus actuation of the double acting cylinder and piston unit 19 will cause rotation of the torque tube 5 and disc 4 through approximately an arc of rotation of about 240°.

Brackets 23 are rigidly secured to the front face of wheel 4 through the intermediary of an insulating asbestos sheet 24. Brackets 23 mount in a vertical plane support plate 25 for removably supporting one core box half secured thereto in any conventional manner. The support plate 25 is electrically heated by means of electric resistance elements passing through bores 26 made in plate 25; however support plate 25 may be also heated by gas or by any other suitable means. A ram assembly comprising a pair of air and oil cylinder and piston units 27 are arranged on each side of the torque tube 5 being parallel thereto and equally spaced therefrom, and are rigidly secured to the wheel 4.

Figure 4:
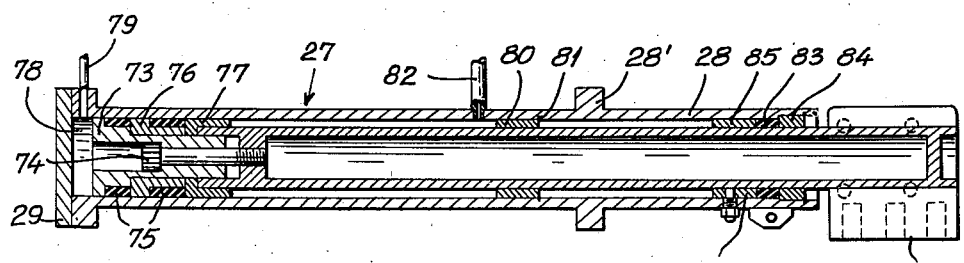
FIGURE 4 is a longitutdinal section of one of the cylinders of the ram assembly.

More specifically each cylinder 28 passes through a hole made near the periphery of wheel 4 and is rigidly secured to said wheel by its radial flange 28' (see FIGURE 4). The rear ends of the cylinders 28 are rigidly interconnected by a tie member 29 which has a central hole through which freely passes the torque tube 5. The outer end of the piston tube 30 of each cylinder and piston unit 27 is provided with an anchoring member 31 (see FIGURE 4) rigidly secured by bolts to a vertical bracket plate 32. The two bracket plates 32 are parallel to each other and spaced apart and they support bearing blocks 33 in which is journaled a cross shaft 34 to which is secured, intermediate the bearing blocks 33, a pivotable bracket 35 on which is removably mounted the second support plate 36 for supporting the other core box half. The support plate 36 is similar to support plate 25 and is either electrically or gas heated.

In the drawings, it is shown as provided with bores 37 for the insertion of electric resistance elements for electric heating.

A hydraulic cylinder and piston unit 38 serves to pivot in a vertical plane the assembly of the support plate 36, core box half secured thereto, and pivotable bracket 35 about cross shaft 34. The cylinder 39 of unit 38 is pivoted near its upper end at 40 to and between the bracket plates 32 while the upper end of its piston rod 41 is pivoted at 42 to the pivotable bracket 35 above the cross shaft 34. The lower ends of the bracket plates 32 are rigidly interconnected by cross members 43. It will be understood that operation of the double acting cylinder and piston unit 38 will pivot the support or flip plate 36 from an upright position shown in FIGURES 1, 6, or 7 to an outwardly inclined position shown in FIGURE 8.

A sand box or hopper 44 of generally rectangular shape and opened at the top is rigidly secured to a laterally extending tube 45 which is itself adjustably clamped within a split clamp 46 pivoted at 47 on a bracket 48 mounted at the back of the wheel 4. Tube 45 freely passes through a hole 49 made in the wheel 4 and the position of the hopper 44 can be adjusted by longitudinally displacing the tube 45 within the unscrewed clamp 46 and then tightening clamp 46 around tube 45 in order to adjust the hopper such that its top opening 50 will be in register with the inlet provided in the core box halves supported by plates 25 and 36.

The hopper 44 and its supporting tube 45 are pivotable in a vertical plane about pivot 47, under the action of double acting lifting hydraulic cylinder and piston units 51, one end of each of which is pivoted to the side of the box at 52, and the other end is pivoted to an ear 53 depending from the cylinder 28 of ram cylinder 27. (See FIGURES 4 and 1.)

The core box halves 54, 54' secured to the support plates 25 and 36 respectively are clearly shown in FIGURE 6 and are attached to the plates so as to protrude downwardly therefrom. The top of hopper 44 is lined with a suitable apertured packing plate to make air tight contact with the lower faces of the core box halves 54, 54' in the investment or raised position of the hopper 44.

During the investment stage, air is blown into the hopper 44 in order to facilitate discharge of the molding material contained therein into the cavity defined by the closed core box halves 54, 54'. The air under pressure is fed to the hopper 44 through support tube 45 and downwardly extending pipe 55 disposed within hopper 44 and having its upper end in communication with tube 45 and its lower outer end provided with a filter 56 and disposed close to the bottom of the hopper 44.

Figure 1:
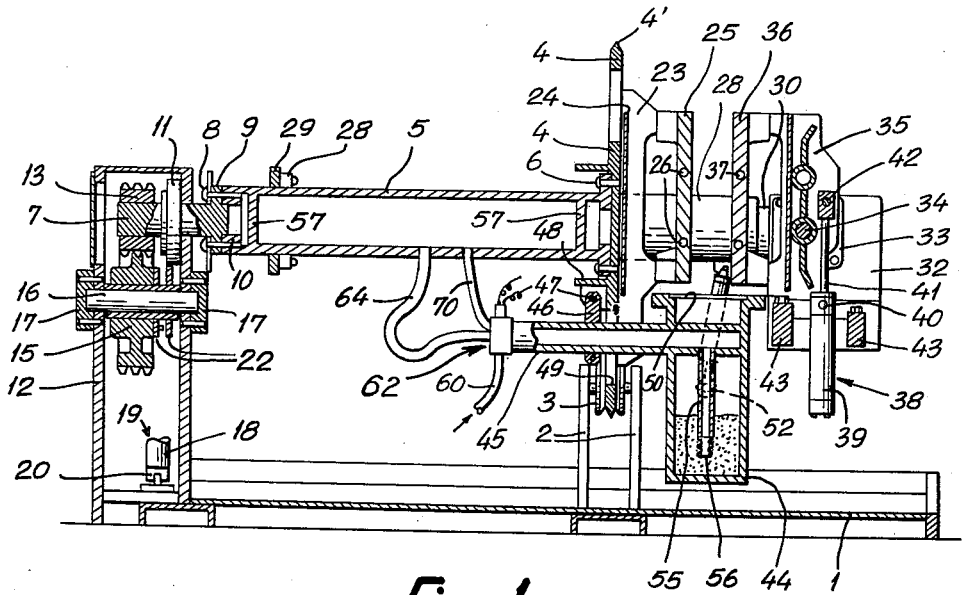
FIGURE 1 is a longitudinal section of the machine of the present invention with the parts ready for the investment step.
Figure 2:
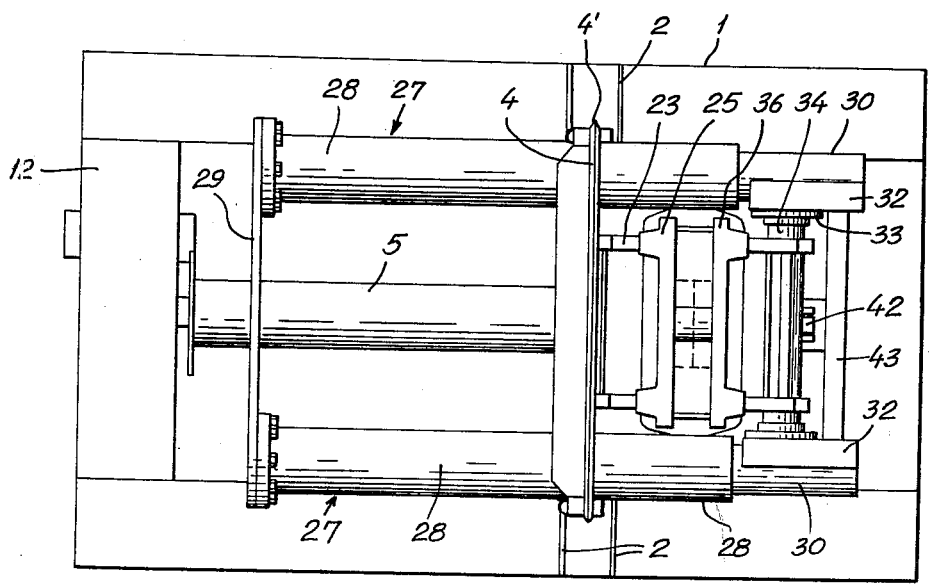
FIGURE 2 is a top plan view of the machine in the same position as FIGURE 1.

The air circuit for blowing the sand from the hopper into the core box uses, in accordance with a feature of the invention, the torque tube 5 as an air reservoir, said torque tube being provided with two partitions 57, as shown in FIGURE 1.

Figure 5:
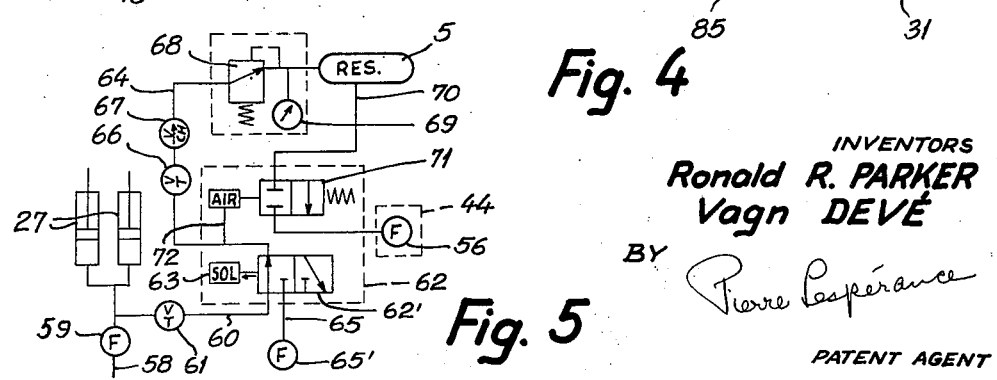
FIGURE 5 is a schematic diagram of the air circuit.

Referring to FIGURE 5, air is fed under pressure from a suitable air supply at about between 80 and 100 p.s.i. through main line 58, filter 59 and branch line 60 provided with a throttle valve 61. Line 60 is connected to a two way pilot controlled valve generally indicated at 62 being preferably a solenoid operated, diaphragm valve such as the valve manufactured by Automatic Switch Company, Florham Park, N.J., under the trademark "ASCO" Catalog No. 8335.

When the solenoid 63 of the pilot valve 62' is energized, communication is established, as shown in FIGURE 5, between lines 60 and 64. When the solenoid is deenergized, line 60 is cut off while line 64 is blown to atmosphere through line 65 and filter 65'. Line 64 is provided with throttle valve 66, check valve 67, pressure reducing valve 68 and pressure gauge 69, and communicates with the reservoir formed by torque tube 5, to thereby fill this reservoir with air at a pressure of approximately 30 p.s.i. However, reservoir 5 cannot be discharged, because its discharge line 60 is cut off by the main diaphragm valve 71 which remains closed while the air pressure fed thereto by the by-pass line 72 connected to line 64. When the solenoid 63 is de-energized thereby cutting off air pressure in line 64, main valve 71 opens and air contained in reservoir 5 is discharged into support tube 45 of hopper 44, pipe 55 and filter 56. Thus, only a predetermined amount of air under a rapidly decreasing pressure is discharged into the hopper to blow off the sand contained therein.

The throttle valve 61 is preferably inserted in the branch line 60 in order to regulate the closing rate of the diaphragm of valve 71. The throttle valve 66 serves to adjust the rate of filling of the reservoir constituted by torque tube 5. Check valve 67 prevents return of the air contained in the reservoir back into line 64.

FIGURE 4 illustrates the construction of the ram cylinders 27. Piston rod 30 is of tubular construction being provided with the anchoring member 31 at its outer end, having a piston head 73 at its inner end secured thereto by means of cap screw 74 and tightly securing thereon packing glands 75, separated by spacer members 76, and piston bearing sleeve 77. This assembly forms a piston in fluid tight contact with the inside surface of the cylinder 28. The end cavity 78 formed at the head of the cylinder 28 is in communication through air inlet 79 with the main air supply line 58, as shown in FIGURE 5. A stop bushing 80 slidably surrounds the piston rod and is secured in position within the cylinder 28 by retaining ring 81 engaging a groove made in the cylinder 28. The stop bushing 80 defines the limit extended position of the piston rod with piston bearing 77 abutting thereagainst. An oil inlet 82 is made in the cylinder 28 just ahead of stop bushing 80. The outer end of the cylinder 28 is provided with a packing gland assembly 83 and retainer 84 and with a guiding bushing 85 for the piston rod.

Thus, to extend the double acting air and oil cylinder and piston unit 27, air under pressure is fed through air inlet 79 which acts against the entire surface of the piston head 73. The core box halves are separated until the support plate 36 attains its outer limit position with the piston bearing sleeve 77 abutting against stop bushing 80. It will be noted that the piston slows down when bearing sleeve 77 moves over oil inlet 82. For the closing stroke of the ram assembly, oil under pressure is fed through oil inlet 82 and said oil causes retraction of the piston by acting on the piston bearing sleeve 77, at the same time returning the air in the cavity 78 back into the reservoir of the air supply, the air in cavity 78 acts as a shock absorber and also there is no loss of air under pressure. Furthermore, as the oil needs only to fill the annular space surrounding the piston rod 30 between center stop bushing 80 and piston bearing sleeve 77, the size of the hydraulic pump necessary to supply the oil under pressure can be decreased considerably. It is also noted, that the closing stroke of the core box is produced by hydraulic oil under pressure thereby obtaining a positive closing of the core box halves. During the extension stroke of the cylinder the oil is discharged through opening 82 which then acts as an oil outlet.

The mold and core blower in accordance with the present invention is operated as follows: At the start of the cycle, the flip plate 36 is in opened position as shown in FIGURE 8 with the hopper 44 in lowered position. A pressure button is pressed to thereby close a circuit which actuates a valve causing extension of cylinder and piston unit 38 which pivots the flip plate 36 into vertical position. This flip plate 36 in turn actuates a limit switch which opens the valve for feeding oil under pressure to the ram cylinders 27 whereby the ram cylinders retract under hydraulic pressure and close the two core box halves 54, 54'. At the end of the closing stroke of the ram cylinders 27, the oil pressure builds up and actuates a pressure switch which actuates the solenoid valve for admitting oil to the lifting cylinders 51 of the hopper 44. The lifting cylinders raise the dump box or hopper 44 which is sealed against the core box halves 54 and 54', as shown in FIGURE 7. In the raised position of the hopper 44, the latter mechanically actuates a limit switch which actuates the valve for energizing the rolling over cylinder and piston unit 19 which causes swinging movement of disc 4 and the assembly of the closed core box halves and hopper 44 in the following manner:

For the investment stage, the assembly is rotated through an arc of approximately 190° to bring the hopper 44 into inverted position whereby the molding material is dumped into the core box. During the investment stage, the solenoid 63 of the valve 62 is energized thereby opening the main diaphragm valve 71 and air which has previously been filling the torque tube reservoir portion is discharged into the hopper 44 to complete the dumping of the molding material into the core box. When solenoid 63 is subsequently de-energized diaphragm valve 71 closes communication between empty reservoir 5, and the hopper 44. The pilot valve 62' simultaneously opens to again permit filling of the torque tube with air under pressure for the next blowing operation.

The rolling over cylinder causes return rotation of the core box and hopper up to 50° past the dead center position thereof and continuous rocking movement on each side of said dead center position for about 50° in order to remove excess sand in the core box. The rocking movement is normally accomplished twice and is regulated by a timer which can be set for a rocking movement of a maximum of about twenty times. The timer keeps the center limit switch open until it runs out. Upon closing of the center limit switch, the machine centers into its dead center position and the hopper is lowered and curing or baking starts. Curing lasts between five seconds and five minutes and is ordinarily about forty five seconds. The curing time depends on the shape, size and other factors of the shell mold or core.

The support plates 25 and 36 are heated to a temperature of between 350 and 700° F., the normal temperature being about 500° F. The plates are heated at a constant temperature during the entire operation of the machine. When curing is completed, the ram cylinders 27 are pushed out by air fed through air inlet 79 until they attain their outer limit position which is regulated by stop bushing 80. This limit position is adjusted such that the flip plate 36 will just clear the other plate during its tilting movement. The position is now as shown in FIGURE 6. In this position, an adjustable cam, not shown, mounted at the rear end of a horizontal rod secured to the flip plate assembly, more particularly a bracket plate 32, actuates a limit switch which causes actuation of the limit switch for the pivotal movement of the flip plate 36 and which centers the double solenoid valve for the ram cylinders 27. Thus, the cylinder 38 is actuated to pivot the flip plate into its outwardly inclined position, as shown in FIGURE 8, whereby the core or mold A retained in the core box half 54' is in a position readily accessible to the operator, such that the latter can grasp the core or mold A with both hands and remove the same from the machine, the core or mold being ready for use in casting.

A suitable parting compound is sprayed onto the core box half 54 supported by plate 25, in order that the finished core will remain in the core box half 54' supported by flip plate 36 at the end of the cycle.

At the end of the cycle, the machine automatically stops and is ready for a next cycle.

As noted above, during the rocking movement of the core box there are no stresses imparted to the ram cylinders, because the latter are supported at their rear ends by the tie member 29 which is itself freely mounted on torque tube 5.

While a preferred embodiment in accordance with the present invention has been illustrated and described, it is understood that various modifications may be resorted to without departing from the spirit and scope of the appended claims.

What we claim is:

1. An apparatus for forming shell molds or cores comprising a pattern adapted to receive molding material therein and formed in separable portions, horizontally extending spaced members supporting one of said portions for translatory movement along a horizontal path of travel relative to the other of said portions from a discharge position in which said portions are separated to a mold forming position with said portions in engagement, said one portion being positioned between said spaced supporting members and pivotally supported thereby for pivotal movement in a vertical plane parallel to said path of travel to enable pivotal movement of said one portion, while in separated position, between a position facing towards said other portion and an outward position facing away from said other portion to permit removing a mold or core therefrom, means to pivot said one portion between said two portions, a hopper for molding material, means supporting said hopper for movement transversely of said path of travel toward and away from said pattern and, means for swinging said pattern, said supporting members and said hopper in a vertical plane transverse to said path of travel for moving said hopper from a position below said pattern to a position above said pattern and vice versa for transferring material from said hopper to said pattern and vice versa.

2. Apparatus for forming shell molds or cores comprising a support element, bearing means rotatably supporting said support element for swinging the same about a horizontal axis, driving means for swinging said support element, a first pattern member carried by said support element, horizontally extending spaced extensible members carried by said support element exteriorly of said first pattern member, a second pattern member disposed between and pivotally connected to the outer ends of said extensible members for pivotal movement, about a horizontal axis, transverse to said first named horizontal axis, between a first position in which said second pattern member faces said first pattern member and a second position in which said second pattern member faces away from said first pattern member, means to pivot said second pattern member between said two positions, means to operate said extensible members to move said second pattern member while in said first position, in a path of movement parallel to said first named horizontal axis towards and away from said first pattern member, between spaced apart positions and a mold forming position with said pattern members in engagement and co-operating to form a cavity provided with an opening for receiving molding material therethrough, a hopper for molding material carried by said support element, whereby said hopper and said pattern members may be swung as a unit about said bearing means, means on said support element for translating said hopper from a position spaced from said pattern members to a position in engagement with said pattern members, said hopper being formed with a discharge opening for discharging molding material therefrom and adapted to register with said pattern members opening when said hopper is in engagement with said pattern members to establish direct communication between said discharge opening and said pattern members opening.

3. In an apparatus as claimed in claim 2, wherein said hopper is adjustably carried by said support element for adjustment of the position thereof longitudinally of said path of movement of said second pattern member in order to bring said hopper in register with said pattern members opening, irrespective of the thickness of said pattern members.

4. An apparatus as claimed in claim 2, further including means for blowing air under pressure in said hopper to assist discharge of said molding material from said hopper into said pattern members, said means for blowing air into said hopper comprising a reservoir, first piping means connected to said reservoir and to a source of air under pressure, second piping means connected to said reservoir and to said hopper and interrelated valve means connected to said first and second piping means to open communication between said air source and said reservoir and close communication between said reservoir and said hopper in one position of said valve means and vice versa in the other position of said valve means, whereby only the air stored in said reservoir is discharged into said hopper in any single blowing operation.

5. An apparatus for forming shell molds or cores comprising a rotatable disc disposed in a vertical plane, bearing means rotatably supporting said disc, driving means on one side of said disc connected thereto for rotating said disc in said vertical plane, a first pattern member supported by the other side of said disc, ram cylinders secured to said disc extending on each side of said first pattern member and having their piston rods movable towards and away from said disc, a bracket disposed between and pivotally mounted on the outer ends of said piston rods for movement in a vertical plane, a second pattern member secured to said pivotable bracket, power means connected between said bracket member and the outer ends of said piston rods for pivoting said bracket member and second pattern member between a first position in which said second pattern member is parallel to and faces said first pattern member and an outwardly inclined second position facing away from said first pattern member, said ram cylinders being actuable to close and separate said pattern members when said second pattern member is in its first position, a hopper pivotally mounted on said disc and disposed under said pattern members, power means carried by said ram cylinders for bringing said hopper in contact with said closed pattern members and means for blowing air under pressure into said hopper.

6. An apparatus as claimed in claim 5, wherein said driving means include a horizontal torque tube secured at one end to the center of said disc, bearing means rotatably supporting the other end of said torque tube, power means drivingly connected to said other end of said torque tube for rotating the same together with said disc, bracket, pattern members, hopper and ram cylinders, and a tie member extending across said torque tube, freely supported thereby and rigidly secured to said ram cylinders.

7. An apparatus as claimed in claim 6, wherein said torque tube is hollow and forms an air reservoir constituting a part of said means for blowing air under pressure into said hopper, said air blowing means further including first and second pipe means connected to said reservoir and respectively connected to an air supply under pressure and to said hopper, and interrelated valve means in said first and second pipe means for cutting off air supply to said reservoir while opening said reservoir to said hopper and vice versa.

8. An apparatus as claimed in claim 5, wherein each ram cylinder includes a cylindrical member having a compressed air inlet at its closed end, its piston rod being tubular and having a diameter only slightly smaller than that of the internal surface of said cylindrical member to define therewith a shallow annular space, a piston at the inner end of said tubular piston rod in slidable engagement with said internal surface of said cylindrical member, a stop bushing secured to said cylindrical member and protruding inwardly to slidably contact said piston rod and serving as an abutment to limit the extension of said piston rod, and an inlet for oil under pressure communicating with said annular space ahead of said stop bushing for causing retracting movement of said piston rod.

9. An apparatus as claimed in claim 5, wherein said hopper is supported by a tube extending laterally therefrom, a clamp pivotally mounted on said disc and removably engaging said tube for adjustably positioning said hopper towards and away from said disc.

References Cited in the file of this patent

UNITED STATES PATENTS

| | | |
|---|---|---|
| 1,695,855 | Moore et al. | Dec. 18, 1928 |
| 2,852,818 | Shallenberger et al. | Sept. 23, 1958 |
| 2,929,119 | Ronne | Mar. 22, 1960 |

FOREIGN PATENTS

| | | |
|---|---|---|
| 819,091 | Great Britain | Aug. 26, 1959 |